United States Patent
Korenaga et al.

(10) Patent No.: US 6,847,773 B2
(45) Date of Patent: Jan. 25, 2005

(54) OPTICAL WAVEGUIDE AND METHOD FOR MANUFACTURING THE SAME

(75) Inventors: Tsuguhiro Korenaga, Katano (JP); Kunio Hibino, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 54 days.

(21) Appl. No.: 10/608,342

(22) Filed: Jun. 27, 2003

(65) Prior Publication Data

US 2004/0001684 A1 Jan. 1, 2004

(30) Foreign Application Priority Data

Jun. 27, 2002 (JP) .......................................... 2002-187209

(51) Int. Cl.[7] .............................................. G02B 6/10
(52) U.S. Cl. .................................... 385/132; 385/147
(58) Field of Search ............................... 385/122–132, 385/147, 15, 16; 252/512, 514; 372/21; 528/10, 31

(56) References Cited

U.S. PATENT DOCUMENTS 5,482,656 A * 1/1996 Hiraoka et al. ............. 252/514
5,530,956 A * 6/1996 Hiraoka et al. ............. 385/122
5,858,051 A   1/1999 Komiyama et al.

FOREIGN PATENT DOCUMENTS

| JP | 63-139304 | 6/1988 |
| JP | 6-222234 | 8/1994 |
| JP | 8-320420 | 12/1996 |
| JP | 11-305055 | 11/1999 |

* cited by examiner

Primary Examiner—Akm Enayet Ullah
(74) Attorney, Agent, or Firm—Merchant & Gould P.C.

(57) ABSTRACT

An optical waveguide includes a first cladding, a second cladding, and a core. The core is embedded in the first cladding so as to be exposed on one principal surface of the first cladding that is opposed to the second cladding. The first cladding and the second cladding are arranged so as to sandwich the core. The core is a product formed by a reaction in which a polymeric material that includes branched polysilane and polysiloxane is subjected to at least one process selected from heating and ultraviolet irradiation. The refractive index of the core is higher than the refractive indices of the first cladding and the second cladding.

15 Claims, 10 Drawing Sheets

OPTICAL WAVEGUIDE AND METHOD FOR MANUFACTURING THE SAME

BACKGROUND OF THE INVENTION

1. Field of the Invention

The present invention relates to an optical waveguide used mainly, e.g., in optical communications and a method for manufacturing the optical waveguide.

2. Description of the Related Art

With the progress in the market of optical communications, optical components need to achieve both high performance and low cost. In particular, there has been an increasing demand for low-cost passive optical components that do not operate themselves.

The fabrication of an optical waveguide requires a very fine precise pattern. The specification of pattern accuracy is strict particularly for a single mode optical waveguide. A general method for forming such a pattern is dry etching, which has been used often in a semiconductor process. The conventional manufacturing process of a single mode optical waveguide for optical communications will be described below by referring to the drawings.

FIGS. 12A and 12B show the configuration of a general single mode silica glass optical waveguide. FIG. 12A is a plan view of the optical waveguide, and FIG. 12B is a cross-sectional view taken along the line A—A in FIG. 12A. A core 121 that serves as a waveguide layer is formed in a cladding 122. The refractive index of the core 121 is higher than that of the cladding 122. Light under certain conditions is trapped and propagated in the core 121 in the direction of the arrow 123. For example, when a guided optical wave having a wavelength of 1.3 $\mu$m to 1.55 $\mu$m, the core 121 generally is about 8 $\mu$m square in cross section, as shown in FIG. 12B. The core 121 can be patterned into a desired shape, e.g., Y-branch, thereby providing various optical circuit structures. The shape and surface roughness of the core significantly affect the light propagation ability.

FIGS. 13A to 13C show the process of a general method for manufacturing a conventional silica glass optical waveguide. First, a core film 131 is formed on a quartz substrate, which is also used as a lower cladding layer 132, by flame hydrolysis deposition (FHD), as shown in FIG. 13A. In the FHD process, a flame of $H_2$ and $O_2$ is produced in the air, and $SiCl_4$ and a small amount of $GeCl_4$ are mixed and hydrolyzed in the flame to form Ge-doped $SiO_2$ (a core film 131). The resultant $SiO_2$ is deposited on the quartz substrate in fine powder form, heated at temperatures of not less than 1000° C., and thus changed to glass. The glass $SiO_2$ is the core film 131 When a substrate other than the quartz substrate is used, the lower gladding layer 132 should be formed on this substrate by FHD before forming the core film 131.

Next, the core film 131 (FIG. 13A) is patterned into a desired shape by photolithography and dry etching, resulting in a core 131a (FIG. 13B).

Further, an upper cladding layer 133 is formed on the lower cladding 132 and the core 131a by FHD (FIG. 13C). An optical waveguide thus produced can achieve low loss and good characteristics.

In addition to the quartz material, resin has been studied recently as an optical waveguide material. At present, resin is inferior to quartz in both transmission capacity and reliability. However, resin can be molded easily compared with quartz and exhibit high transmission capacity for light in the wavelength region of 650 nm to 850 nm. Therefore, resin is a very promising material for an optical waveguide. Examples of the resin material include polymethyl methacrylate (PMMA) having excellent transparency. A resin material obtained by deuteration or fluorination of acrylic resin, epoxy resin or polyimide resin also has been used in recent years. This resin material absorbs less light in the wavelength region of 1.3 $\mu$m to 1.55 $\mu$m. Accordingly, the above materials can provide a low-loss optical waveguide.

A general manufacturing method for an optical waveguide using a resin material includes forming a core layer and a cladding layer mainly by spin coating and patterning the core layer by dry etching.

As described above, whether quartz or resin, the conventional method has to repeat the deposition of the cladding layer that has a thickness of not less than 20 $\mu$m. Then, the core layer is formed and patterned into a convex shape by dry etching. However, complicated equipment is required to perform the dry etching. Therefore, the conventional method has the problems of cost and productivity. To solve the problems, various methods for manufacturing an optical waveguide have been proposed. A typical example of those methods is a groove-filling technique.

An example of an optical waveguide with a filled groove is disclosed in JP 63(1988)-139304 A, JP 8(1996)-320420 A, or JP 11(1999)-305055 A. The groove-filling technique will be described by referring to FIGS. 14A to 14D, which show the process of a method for manufacturing an optical waveguide with a filled groove.

As shown in FIG. 14A, a groove 142 that corresponds to a desired core pattern is formed in a cladding 141 (a glass or resin substrate). In this case, dry etching can be used generally to form the groove 142. Then, the groove 142 is filled with a core material 143 whose refractive index is higher than that of the cladding 141 (FIG. 14B). The overflow 143b from the groove is removed, and a core 143a is formed in the substrate 141 (FIG. 14C). Finally, a cladding 144 is formed on the core 143a and the substrate 141 (FIG. 14D), thus producing an optical waveguide with a filled groove. Although this method is similar to that shown in FIGS. 13A to 13C in the use of dry etching, it can achieve higher efficiency and productivity than the method shown in FIGS. 13A to 13C.

However, the groove-filling technique causes different problems when a quartz material is used as the core material and when a resin material, typified by acrylic resin, epoxy resin, or polyimide resin, is used as the core material.

The following is an explanation of the problem of a quartz glass material. Typical examples of a method for filling the core material in the groove of an optical waveguide include FHD, CVD, vacuum deposition, and sputtering. For a single mode optical waveguide, the core should have a thickness of about 8 $\mu$m. For a multimode optical waveguide, the core should have a thickness of as much as several tens $\mu$m. It takes a considerable length of time to form such a thick film, which results in a production disadvantage.

The following is an explanation of the problem of a resin material such as acrylic resin, epoxy resin, and polyimide resin. When a resin material is used as the core material, the necessary film thickness can be achieved easily, e.g., by spin coating. However, the removal of the overflow 143b as shown in FIG. 14C is a problem. The resin material has low hardness, so that small flaws are generated on the surface of the core 143a due to polishing. These flaws cause the scattering of a guided optical wave and leads to a large waveguide loss. As an alternative method, dry etching can be used to remove the overflow. However, the dry etching has the disadvantage of cost as described above.

Therefore, even if an optical waveguide is produced by the groove-filling technique that uses a quartz material or a resin material such as acrylic resin, epoxy resin, and polyimide resin, the optical waveguide cannot achieve high productivity and high performance.

SUMMARY OF THE INVENTION

Therefore, with the foregoing in mind, it is an object of the present invention to provide an optical waveguide that can achieve both high productivity and high performance, and a method for manufacturing the optical waveguide.

An optical waveguide of the present invention includes a first cladding, a second cladding, and a core. The core is embedded in the first cladding so as to be exposed on one principal surface of the first cladding that is opposed to the second cladding. The first cladding and the second cladding are arranged so as to sandwich the core. The core is a product formed by a reaction in which a polymeric material that includes branched polysilane and polysiloxane is subjected to at least one process selected from heating and ultraviolet irradiation. The refractive index of the core is higher than the refractive indices of the first cladding and the second cladding. This optical waveguide can reduce losses and achieve high performance.

The refractive index of the second cladding may be substantially equal to that of the first cladding.

The first cladding and the second cladding may be glass.

It is preferable that an adhesive layer is formed between the first cladding including the core and the second cladding. This allows the first cladding and the second cladding to be bonded without heating, so that the characteristics of each member are not changed.

The adhesive layer may include a polymeric material that includes branched polysilane and polysiloxane.

It is preferable that the refractive index of the adhesive layer is substantially equal to or higher than that of the second cladding. This allows a guided optical wave to be trapped and propagated in the core.

A method for manufacturing an optical waveguide of the present invention includes: heating and softening a first cladding; forming a groove in the first cladding as a core by pressing a molding die onto the first cladding; filling the groove with a core material including a polymeric material that includes branched polysilane and polysiloxane; heating the core material to cause a reaction that changes the refractive index of the core material; and bonding a second cladding to the surface of the first cladding that is provided with the groove. According to this method, a high-performance optical waveguide in which the core surface is free of flaws can be produced efficiently.

The first cladding and the second cladding may be glass.

The refractive index of the second cladding may be substantially equal to that of the first cladding.

It is preferable that the core material is a resin solution including the polymeric material and a solvent; the core material of the resin solution is applied to the surface of the first cladding that is provided with the groove, and the groove is filled with the core material; the core material is heated to change the refractive index, and the core material other than that filled in the groove is removed by polishing; and the second cladding is bonded to the surface of the first cladding that is provided with the groove by direct bonding after the polishing. According to this method, a low-loss high-performance optical waveguide can be produced easily. The method also can facilitate the control of the refractive index of the core.

It is preferable that an adhesive is applied to at least one of the surface of the first cladding that is provided with the groove and the surface of the second cladding that is bonded to the first cladding after the removal of the core material by polishing, and the first cladding and the second cladding are bonded together via the adhesive. The adhesive may have a refractive index substantially equal to that of the second cladding. This method can bond the first cladding and the second cladding easily without heating, prevent the degradation of performance, and achieve high productivity.

It is preferable that the core material is a resin solution including the polymeric material and a solvent; the core material of the resin solution is applied to at least one of the surface of the first cladding that is provided with the groove and the surface of the second cladding that is bonded to the first cladding; the core material is pressed between the first cladding and the second cladding, and then is heated to change the refractive index; the groove is filled with the core material; and the first cladding and the second cladding are bonded together via the core material. According to this method, the refractive index of the core material can be controlled while the first cladding and the second cladding are bonded together. Thus, it is possible to reduce the number of steps in the fabrication of an optical waveguide.

It is preferable that the core material is a resin solution including at least the polymeric material and a solvent; the core material of the resin solution is applied to at least one of the surface of the first cladding that is provided with the groove and the surface of the second cladding that is bonded to the first cladding, and then is heated to evaporate the solvent; and the heating is started at a temperature of not more than a boiling point of the solvent, and the temperature is increased to a temperature less than a temperature at which the reaction that changes the refractive index of the core material is started. This method can prevent unevenness of the coating surface of the core material as well as a joint defect between the first cladding and the second cladding.

It is preferable that the core material is a film including at least the polymeric material; the core material of the film is deposited on at least one of the surface of the first cladding that is provided with the groove and the surface of the second cladding that is bonded to the first cladding; the core material is pressed between the first cladding and the second cladding, and then is heated to change the refractive index; the groove is filled with the core material; and the first cladding and the second cladding are bonded together via the core material. According to this method, the refractive index of the core material can be controlled while the first cladding and the second cladding are bonded together. Thus, it is possible to reduce the number of steps in the fabrication of an optical waveguide.

It is preferable that the core material is a liquid polymeric material including at least branched polysilane and polysiloxane; the core material of the liquid polymeric material is dropped on at least one of the surface of the first cladding that is provided with the groove and the surface of the second cladding that is bonded to the first cladding; the core material is pressed between the first cladding and the second cladding, and then is heated to change the refractive index; the groove is filled with the core material; and the first cladding and the second cladding are bonded together via the core material. According to this method, the refractive index of the core material can be controlled while the first cladding and the second cladding are bonded together. Thus, it is possible to reduce the number of steps in the fabrication of an optical waveguide.

DESCRIPTION OF THE PREFERRED EMBODIMENTS

Embodiment 1

Figure 1:
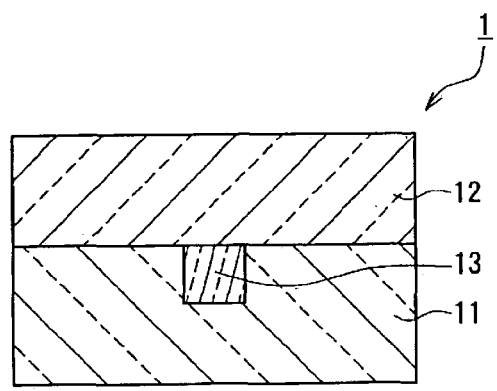
FIG. 1 is a cross-sectional view showing the configuration of an optical waveguide of Embodiment 1.

An optical waveguide of Embodiment 1 of the present invention will be described with reference to the drawings. FIG. 1 is a cross-sectional view showing the configuration of an optical waveguide 1. As shown in FIG. 1, the optical waveguide 1 includes a core 13 and glass substrates (claddings) 11, 12 that surround the core 13. A guided optical wave is trapped and propagated in the core 13.

The core 13 is embedded in the glass substrate 11 so as to be exposed on the principal surface of the glass substrate 11 that is opposed to the glass substrate 12. The glass substrates 11, 12 are arranged so as to sandwich the core 13. The glass substrates 11, 12 can be made of the same material.

A product formed, e.g., by heating a polymeric material that includes branched polysilane and polysiloxane is used as the core 13. The cross section of the core 13 is, e.g., 8 $\mu$m square. It is preferable that a relative refractive index difference between the core 13 and the glass substrates (claddings) 11, 12 is 0.25%. The relative refractive index difference is expressed as a percentage of a difference in the square of refractive index between the core and the claddings with respect to two times the square of refractive index of the core. Specifically, the relative refractive index difference $\Delta$ can be expressed by $$\Delta = (n_1^2 - n_2^2)/2n_1^2 \times 100 \ (\%)$$

where $n_1$ is the refractive index of the core and $n_2$ is the refractive index of the claddings.

Like a single mode waveguide, when a refractive index difference between the core and the claddings is small, the relative refractive index difference can be approximated by a percentage of a difference in refractive index between the core and the claddings with respect to the refractive index of the core. In this case, the relative refractive index can be expressed by $$\Delta \approx (n_1 - n_2)/n_1 \times 100 \ (\%).$$

The refractive index of the core 13 is higher than the refractive indices of the glass substrates 11, 12. The optical waveguide 1 with this configuration can transmit the guided optical waves having wavelengths of 1.3 $\mu$m and 1.55 $\mu$m in a single mode. The 1.3 $\mu$m and 1.55 $\mu$m guided optical waves often are used in optical communications.

The core 13 is a product formed by a reaction in which the polymeric material including branched polysilane and polysiloxane is heated or irradiated with ultraviolet rays. As the reaction proceeds, organic components (e.g., C or H) are eliminated, and a chemical bond of the branched polysilane is changed from Si—Si to —O—Si—O—. This reaction is referred to as an "inorganic reaction" in the following. The polymeric material has such characteristics that its refractive index is reduced by the inorganic reaction. Moreover, the polymeric material adheres well to a glass material.

By changing a mixing ratio of branched polysilane and polysiloxane, the heating conditions, or the ultraviolet irradiation conditions, the inorganic reaction can be controlled, and thus the refractive index of the core 13 can be controlled as well. This makes it possible to adjust the relative refractive index difference between the core 13 and the glass substrates 11, 12 precisely to a desired value. As described above, the optical waveguide 1 having, e.g., a relative refractive index difference of 0.25% can transmit the 1.3 $\mu$m and 1.55 $\mu$m guided optical waves in a single mode.

When a product of the inorganic reaction that involves heating of the polymeric material is irradiated partially with ultraviolet rays, the refractive index of the irradiated portion is further reduced. This effect can be used to provide a predetermined refractive index distribution in the core 13 of the optical waveguide 1. Thus, the optical waveguide 1 also can have the filter function of transmitting or reflecting a specific wavelength.

Hereinafter, a method for manufacturing the optical waveguide 1 will be described with reference to the drawings. FIGS. 2A to 2D show the process of the manufacturing method. FIG. 3 shows the configuration of a press-molding apparatus 30 used in the manufacture of the optical waveguide 1.

Figure 2A:
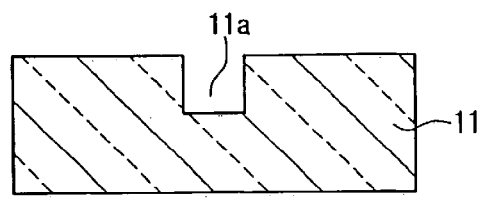
FIGS. 2A to 2D show a flow chart of a method for manufacturing an optical waveguide of Embodiment 1.
Figure 3:
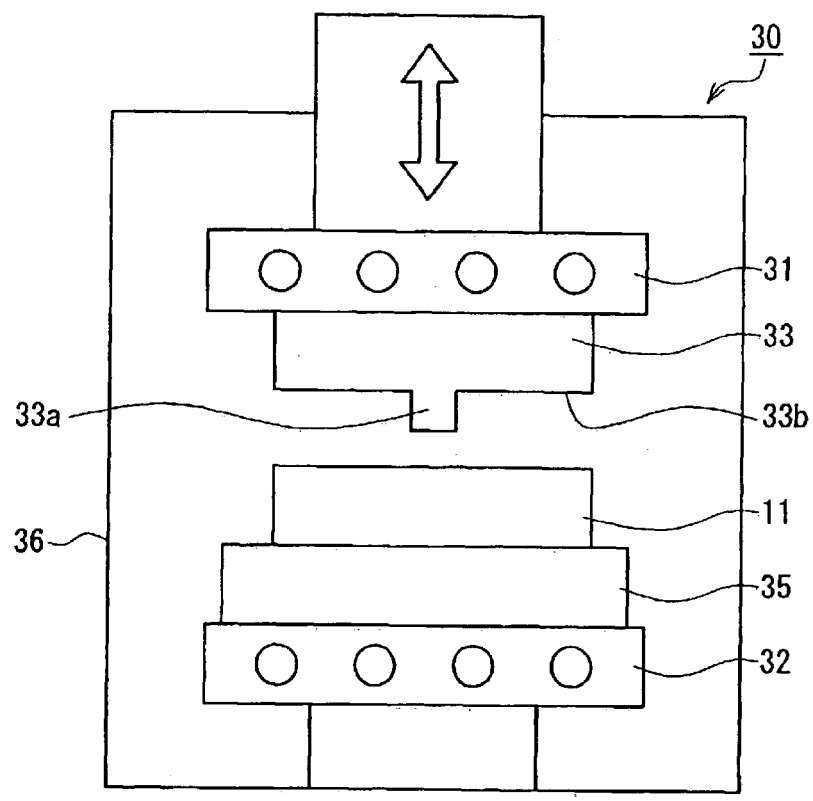
FIG. 3 shows the configuration of a press-molding apparatus used in the manufacture of an optical waveguide of Embodiment 1.

First, as shown in FIG. 2A, a groove 11a is formed in a glass substrate 11 by a glass forming method. As an example of the glass forming method, the press-molding apparatus 30 can be used. The press-molding apparatus 30 includes a chamber 36 in which a pair of upper and lower heater blocks 31, 32 are located. The upper heater block 31 can move up and down, while the lower heater block 32 is fixed. The upper heater block 31 is provided with an upper die 33 (20 mm-square in size). A protrusion 33a is formed on a molding surface 33b of the upper die 33. The protrusion 33a is processed finely by dry etching and used as a convex pattern for forming an optical waveguide. The molding surface 33b of the upper die 33 may be coated with a protective film of noble metal to improve corrosion resistance and releasability from glass or the like. The cross section of the protrusion 33a is 8 $\mu$m square.

A flat lower die 35 is provided on the lower heater block 32. When the groove 11a is formed in the glass substrate 11 as shown in FIG. 2A, an 8 mm-square glass substrate 11 (e.g., optical glass having a refractive index of 1.581 and a softening point of 520° C.) is placed on the lower die 35.

The chamber 36 is filled with nitrogen. The upper heater block 31 is moved downward so that the protrusion 33a of the upper die 33 comes into contact with the glass substrate 11 while applying a low load (e.g., 50 kg/cm$^2$ or less). Under these conditions, the upper and the lower heater block 31, 32 are supplied with electricity and generate heat, by which the glass substrate 11 is heated. The glass substrate 11 is heated, e.g., to the softening point (520° C.) and softened, and the load of the upper heater block 31 is increased to 400 kg/cm$^2$. When the glass substrate 11 is deformed, e.g., by 0.2 mm, the load application and the electricity supply are stopped so as to cool the glass substrate 11. The thickness of the glass substrate 11 is reduced by 0.2 mm as described above, which in turn increases the area of the principal surface of the glass substrate 11. The surface and cross section of the glass substrate 11 having the groove 11a thus produced were observed with an optical microscope and an electron microscope. The observation showed that a finely patterned groove 11a was formed in the glass substrate 11, and that the protrusion 33a (i.e., the convex pattern of the upper die 33) was transferred precisely to the glass substrate 11.

Figure 2B:
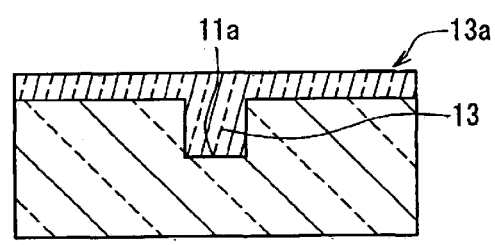

Next, a resin layer 13a is formed on the glass substrate 11 (FIG. 2A) by spin coating, so that the groove 11a is filled with the resin layer 13a, as shown in FIG. 2B. The resin layer 13a is formed by applying a core material to the surface of the glass substrate 11 that is provided with the groove 11a. The core material is a resin solution including a solvent and the polymeric material that includes branched polysilane and polysiloxane. In addition to the spin coating, the general techniques for forming a uniform coating can be employed, such as dipping, spraying, and braiding. The resin layer 13a having a sufficient thickness can be formed easily, thus achieving high production efficiency.

The following is an explanation of the polymeric material used for the core material. The branching degree of branched polysilane is preferably 5% to 25%, and most preferably 20%. When the branching degree is less than 5%, the branching effect is lost, rendering, e.g., a birefringent property to the core material. When the branching degree is more than 25%, it becomes difficult to fill the core material in the groove 11a.

Branched polysilane and polysiloxane are mixed at a mixing ratio so that the core material can exhibit more favorable characteristics. Specifically, the core material is soft enough to be filled easily in the groove 11a and adheres firmly to the inner wall of the groove 11a without leaving any space therebetween. For this reason, the mixing ratio may be 25 to 100 parts of polysiloxane per 100 parts of branched polysilane, and preferably 50 to 75 parts of polysiloxane per 100 parts of branched polysilane. The following embodiments use the core material obtained by mixing 50 parts of polysiloxane with 100 parts of branched polysilane.

General solvents, such as toluene, anisole, and an organic solvent, can be used as the solvent included in the resin solution (the core material). The solvent is added so that the resin solution has an appropriate concentration depending on the coating thickness or the like. The preferred concentration of the solvent is 30% to 60%. The core material also can include a general additive, e.g., a surface-active agent to improve the coating state.

After the formation of the resin layer 13a, the glass substrate 11 is placed on a hot plate and preheated, e.g., at a starting temperature of 120° C. The temperature is increased to 200° C. so that the solvent component is removed. The desired starting temperature is not more than a boiling point of the solvent in the resin solution. In the subsequent process, it is desirable that the glass substrate 11 is heated while increasing the temperature continuously. The upper limit of the temperature may be less than a temperature at which the refractive index of the polymeric material starts to change (referred to as "reaction onset temperature"). If the preheating is performed at a starting temperature higher than a boiling point of the solvent in the resin solution, the surface of the resin layer 13a becomes uneven.

When the polymeric material is heated, the inorganic reaction occurs to change the refractive index. Therefore, a heating temperature at which a desired refractive index can be achieved is determined beforehand based on a calibration curve that shows the relationship between a refractive index and a heating temperature in accordance with actual measurement. For example, a temperature (350° C.) at which the refractive index (ranging from 1.583 to 1.584) of the core 13 meets the single mode condition is determined by the calibration curve, and the glass substrate is heated to this temperature. Consequently, the core 13 of the optical waveguide 1 can have a desired refractive index.

Figure 2C:
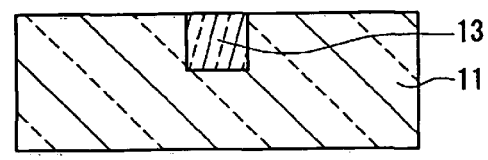

Next, as shown in FIG. 2C, the unnecessary portion of the resin layer 13a (FIG. 2B) other than the core 13 is removed by polishing. A product formed by a reaction in which the polymeric material for the resin layer 13a may be heated is an intermediate material between organic and inorganic substances. Therefore, unlike a general resin material, the product does not develop small flaws due to polishing, resulting in a very smooth polished surface. Thus, a high-performance optical waveguide can be achieved.

When branched polysilane and polysiloxane (both are organic substances) are heated or irradiated with ultraviolet rays, they absorb oxygen in the air and get close to $SiO_2$ while eliminating organic components, i.e., become an intermediate material between organic and inorganic substances. However, they are not changed completely to $SiO_2$, so that some organic components are left.

The volume of the polymeric material that includes branched polysilane and polysiloxane shrinks by heating. Therefore, when the resin layer 13a is made thin, it may not fill the entire groove 11a because of heating to change the refractive index. Accordingly, the resultant core 13 is smaller than a predetermined size. To solve this problem, the groove 11a has been formed deeper than the core 13 of the optical waveguide 1 as a finished product. That is, the protrusion 33a of the upper die 33 in FIG. 3 should be higher than 8 μm. In this manner, the glass substrate 11 can be heated with the resin layer 13a having a sufficient thickness in the groove 11a, and the thickness of the core 13 can be at least a predetermined thickness. Moreover, a desired core size can be achieved by adjusting the amount of polishing of the glass substrate 11 and the core 13. For example, the core 13 may be formed in a thickness of 8 μm.

Figure 2D:
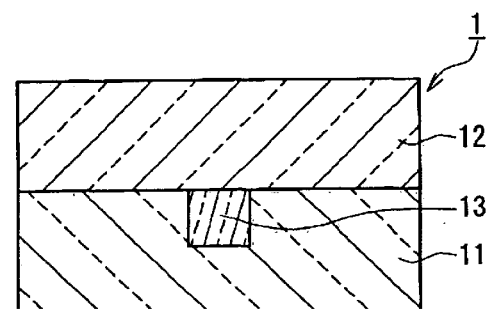

Finally, as shown in FIG. 2D, a smooth glass substrate 12 is bonded to the glass substrate 11 directly without using an adhesive or the like so that the core 13 is sandwiched between them, thus producing an optical waveguide 1. Specifically, both the surface of the glass substrate 11 that is provided with the core 13 and the surface of the glass substrate 12 that is bonded to the glass substrate 11 are washed fully with acids or solvents, then heated, e.g., to 350° C., and bonded together by direct bonding. In this case, heating for the direct bonding can be performed at about 300° C. to 400° C.

The surface and cross section of a sample of the optical waveguide 1 thus produced were observed with an optical microscope and an electron microscope. The observation showed that the core 13 was free of bubbles or foreign substances caused by a deficiency of the core material filled in the groove 11a or a joint defect.

The single mode optical waveguide 1 was connected to a single mode quartz optical fiber, through which light having a wavelength of 1.55 μm was propagated to measure a propagation loss. The measured propagation loss was about 0.07 dB/cm and not a problem in practical use. The propagation loss was not varied at all even in the environment of −40° C. to 80° C. The temperature dependence of the refractive index of the core material (a product formed by a reaction in which the polymeric material may be heated) is the same as that of the refractive index of the cladding material (optical glass). Therefore, a combination of these materials is very excellent for forming an optical waveguide.

In Embodiment 1, the polymeric material including branched polysilane and polysiloxane is first heated so that the inorganic reaction occurs to change the refractive index. However, the refractive index also can be changed by irradiating the polymeric material with ultraviolet rays in advance of heating. With this ultraviolet irradiation, even when the polymeric material should be heated further until it has a desired refractive index, the heating can be performed at lower temperatures.

Embodiment 2

Figure 4:
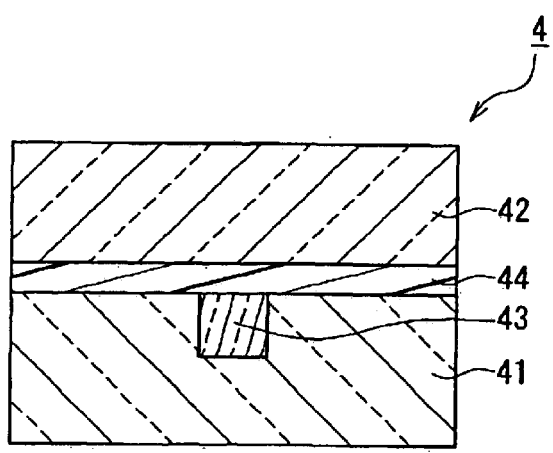
FIG. 4 is a cross-sectional view showing the configuration of an optical waveguide of Embodiment 2.

An optical waveguide of Embodiment 2 of the present invention will be described with reference to the drawings. FIG. 4 is a cross-sectional view showing the configuration of an optical waveguide 4. As shown in FIG. 4, the optical waveguide 4 includes a core 43, glass substrates (claddings) 41, 42 that surround the core 43, and an adhesive layer 44. A guided optical wave is trapped and propagated in the core 43.

The core 43 is embedded in the glass substrate 41 so as to be exposed on the principal surface of the glass substrate 41 that is opposed to the glass substrate 42. The glass substrates 41, 42 are arranged so as to sandwich the core 43 via the adhesive layer 44. The glass substrates 41, 42 can be made of the same material. The refractive index of the adhesive layer 44 can be the same as the refractive indices of the glass substrates 41, 42.

A product formed, e.g., by heating a polymeric material that includes branched polysilane and polysiloxane is used as the core 43. The cross section of the core 43 is, e.g., 8 μm square. It is preferable that a relative refractive index difference between the core 43 and the glass substrates (claddings) 41, 42 is 0.25%. The refractive index of the core 43 is higher than the refractive indices of the glass substrates 41, 42. The optical waveguide 4 with this configuration can transmit the guided optical waves having wavelengths of 1.3 μm and 1.55 μm in a single mode. The 1.3 μm and 1.55 μm guided optical waves are often used in optical communications.

The core 43 is a product formed by a reaction (inorganic reaction) in which the polymeric material including branched polysilane and polysiloxane is heated or irradiated with ultraviolet rays. The polymeric material has such characteristics that its refractive index is reduced by the inorganic reaction. Moreover, the polymeric material adheres well to a glass material.

By changing a mixing ratio of branched polysilane and polysiloxane, the heating conditions, or the ultraviolet irradiation conditions, the inorganic reaction can be controlled, and thus the refractive index of the core 43 can be controlled as well. This makes it possible to adjust the relative refractive index difference between the core 43 and the glass substrates 41, 42 precisely to a desired value. As described above, the optical waveguide 4 having, e.g., a relative refractive index difference of 0.25% can transmit the 1.3 μm and 1.55 μm guided optical waves in a single mode.

When a product of the inorganic reaction that involves heating of the polymeric material is irradiated partially with ultraviolet rays, the refractive index of the irradiated portion is further reduced. This effect can be used to provide predetermined refractive index distribution in the core 43 of the optical waveguide 4. Thus, the optical waveguide 4 also can have the filter function of transmitting or reflecting a specific wavelength.

The adhesive layer 44 is formed between the glass substrate 41 including the core 43 and the glass substrate 42. The adhesive layer 44 should be transparent to the wavelength of light that is propagated in the optical waveguide 4. Therefore, a fluorinated epoxy-based ultraviolet curable resin or a thermosetting adhesive may be used as the adhesive layer 44. The refractive index of the adhesive layer 44 can be at least the refractive indices of the glass substrates 41, 42.

The polymeric material that includes branched polysilane and polysiloxane can be used for the adhesive layer 44 as well as the core 43 because it adheres to glass. In particular, when the adhesive layer 44 is formed by depositing the polymeric material in a thickness of not less than 20 μm, it can serve as a cladding. Therefore, the optical waveguide functions sufficiently even without the glass substrate 42.

Figure 5A:
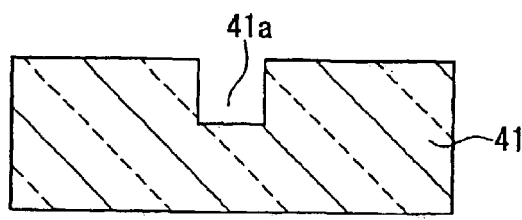
FIGS. 5A to 5E show a flow chart of a method for manufacturing an optical waveguide of Embodiment 2.

Hereinafter, a method for manufacturing the optical waveguide 4 will be described with reference to the drawings. FIGS. 5A to 5E show the process of the manufacturing method. First, as shown in FIG. 5A, a groove 41a is formed in a glass substrate 41 by a glass forming method. Since the groove 41a is formed in the same manner as Embodiment 1 by using the press-molding apparatus in FIG. 3, a detailed explanation will not be repeated.

Figure 5B:
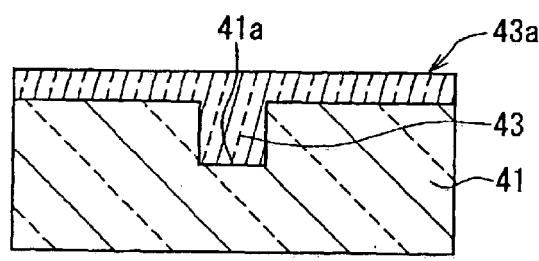

Next, a resin layer 43a is formed on the glass substrate 41 (FIG. 5A) by spin coating, so that the groove 41a is filled with the resin layer 43a, as shown in FIG. 5B. The resin layer 43a is formed by applying a core material to the surface of the glass substrate 41 that is provided with the groove 41a. The core material is a resin solution including a solvent and the polymeric material that includes branched polysilane and polysiloxane. In addition to the spin coating, the general techniques for forming a uniform coating can be employed, such as dipping, spraying, and braiding. The resin layer 43a having a sufficient thickness can be formed easily, thus achieving high production efficiency. A detailed explanation of the resin solution (the core material) has been given in Embodiment 1 and will not be repeated in this embodiment.

After the formation of the resin layer 43a, the glass substrate 41 is placed on a hot plate and preheated, e.g., at a starting temperature of 120° C. The temperature is increased to 200° C. so that the solvent component is removed.

When the polymeric material is heated, the inorganic reaction occurs to change the refractive index. Therefore, a heating temperature at which a desired refractive index can be achieved is determined beforehand based on a calibration curve that shows the relationship between a refractive index and a heating temperature in accordance with actual measurement. For example, a temperature (350° C.) at which the refractive index (ranging from 1.583 to 1.584) of the core 43 meets the single mode condition is determined by the calibration curve, and the glass substrate is heated to this temperature. Consequently, the core 43 of the optical waveguide 4 can have a desired refractive index.

Figure 5C:
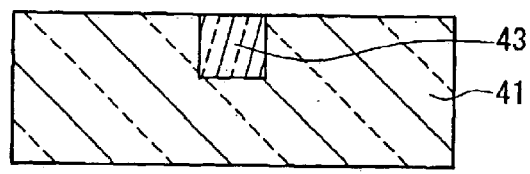

Next, as shown in FIG. 5C, the unnecessary portion of the resin layer 43a (FIG. 5B) other than the core 43 is removed by polishing. A product formed by a reaction in which the polymeric material for the resin layer 43a may be heated is an intermediate material between organic and inorganic substances. Therefore, unlike a general resin material, the product does not develop small flaws due to polishing, resulting in a very smooth polished surface.

The volume of the polymeric material that includes branched polysilane and polysiloxane shrinks by heating. Therefore, when the resin layer 43a is made thin, it may not fill the entire groove 41a because of heating to change the refractive index. Accordingly, the resultant core 43 is smaller than a predetermined size. To solve this problem, the groove 41a has been formed deeper than the core 43 of the optical waveguide 4 as a finished product. That is, the protrusion 33a of the upper die 33 in FIG. 3 should be higher than 8 $\mu$m. In this manner, the glass substrate can be heated with the resin layer 43a having a sufficient thickness in the groove 41a, and the thickness of the core 43 can be at least a predetermined thickness. Moreover, a desired core size can be achieved by adjusting the amount of polishing of the glass substrate 41 and the core 43. For example, the core 43 may be formed in a thickness of 8 $\mu$m.

Figure 5D:
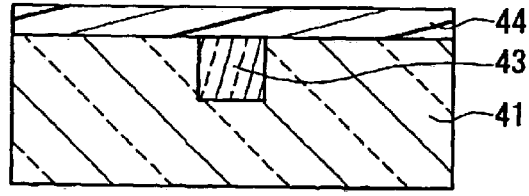

As shown in FIG. 5D, an adhesive layer 44 is formed on the exposed and polished surfaces of the glass substrate 41 and the core 43 (FIG. 5C), e.g., by applying an ultraviolet curable adhesive by spin coating. In addition to the spin coating, the general techniques for forming a uniform coating can be employed, such as dipping, spraying, and braiding.

Figure 5E:
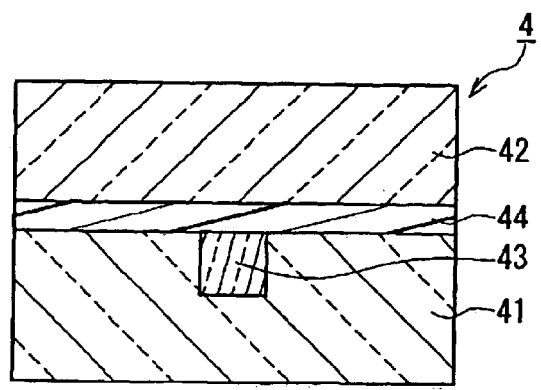

Finally, as shown in FIG. 5E, a smooth glass substrate 42 is bonded to the adhesive layer 44 and irradiated with ultraviolet rays. The ultraviolet curable adhesive (the adhesive layer 44) is cured by the irradiation, thus producing an optical waveguide 4. This process does not require heat treatment, so that each member is not affected by heat. The adhesive layer 44 can have a refractive index that is suitable for a cladding of the optical waveguide 4 and not less than the refractive index of the glass substrate 42.

The surface and cross section of a sample of the optical waveguide 4 thus produced were observed with an optical microscope and an electron microscope. The observation showed that the core 43 was free of bubbles or foreign substances caused by a deficiency of the core material filled in the groove 41a or a joint defect.

The single mode optical waveguide 4 was connected to a single mode quartz optical fiber, through which light having a wavelength of 1.55 $\mu$m was propagated to measure a propagation loss. The measured propagation loss was about 0.10 dB/cm and not a problem in practical use.

Figure 6A:
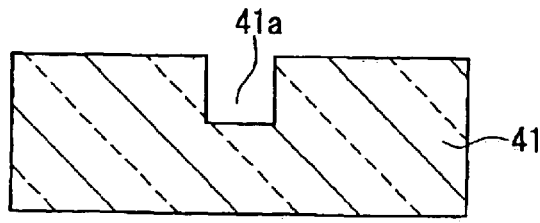
FIGS. 6A to 6E show a flow chart of another method for manufacturing an optical waveguide of Embodiment 2.
Figure 6B:
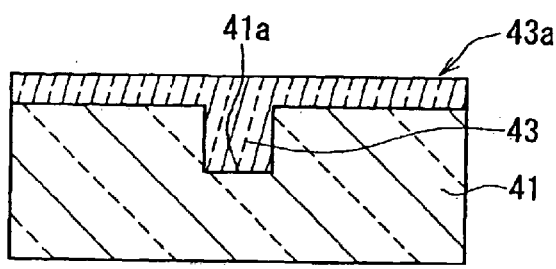
Figure 6C:
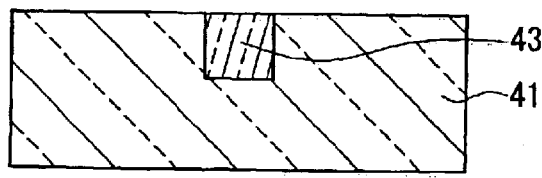

The following is an explanation of another method for manufacturing the optical waveguide 4. FIGS. 6A to 6E show the process of the manufacturing method. This method differs from that shown in FIGS. 5A to 5E in the use of the core material as an adhesive layer 44. Specifically, a resin solution including a solvent and the polymeric material that includes branched polysilane and polysiloxane is used as the adhesive layer 44. Since the processes in FIGS. 6A to 6C are the same as those in FIGS. 5A to 5C, a detailed explanation will not be repeated.

Figure 6D:
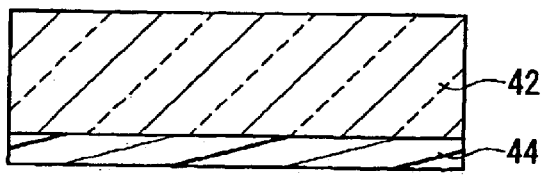

As shown in FIG. 6D, the adhesive layer 44 is formed on the surface of a smooth glass substrate 42 that is bonded to a glass substrate 41, e.g., by applying the resin solution by spin coating. Then, the glass substrate 42 with the adhesive layer 44 is placed on a hot plate and preheated at a starting temperature of 120° C. The temperature is increased to 200° C. so that the solvent component is removed. To achieve a desired refractive index, the glass substrate 42 further is heated, e.g., to 355° C., which has been determined based on a calibration curve showing the relationship between a refractive index and a heating temperature. The adhesive layer 44 can have a refractive index that is suitable for a cladding of the optical waveguide 4 and not less than the refractive index of the glass substrate 42.

Figure 6E:
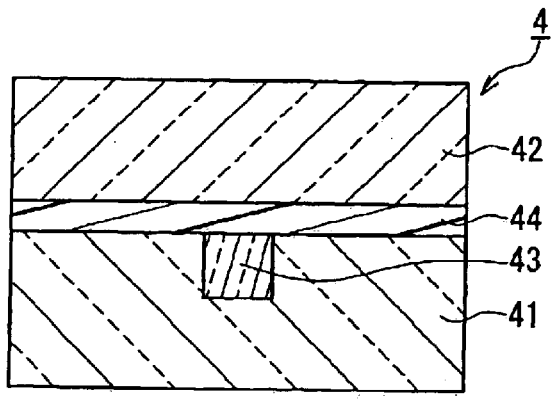

Finally, as shown in FIG. 6E, the glass substrate 41 including a core 43 and the adhesive layer 44 formed on the glass substrate 42 are bonded together so that the core 43 is sandwiched between them. Specifically, both the surface of the glass substrate 41 that is provided with the core 43 and the surface of the adhesive layer 44 that is bonded to the glass substrate 41 are washed fully with acids or solvents, then heated to 350° C., and pressed against each other, thus producing an optical waveguide 4.

The surface and cross section of a sample of the optical waveguide 4 thus produced were observed with an optical microscope and an electron microscope. The observation showed that the core 43 was free of bubbles or foreign substances caused by a deficiency of the core material filled in the groove 41a or a joint defect.

The single mode optical waveguide 4 was connected to a single mode quartz optical fiber, through which light having a wavelength of 1.55 $\mu$m was propagated to measure a propagation loss. The measured propagation loss was about 0.09 dB/cm and not a problem in practical use.

In Embodiment 2, the polymeric material including branched polysilane and polysiloxane is first heated so that the inorganic reaction occurs to change the refractive index. However, the refractive index also can be changed by irradiating the polymeric material with ultraviolet rays in advance of heating. With this ultraviolet irradiation, even when the polymeric material should be heated further until it has a desired refractive index, the heating can be performed at lower temperatures.

Embodiment 3

Figure 7:
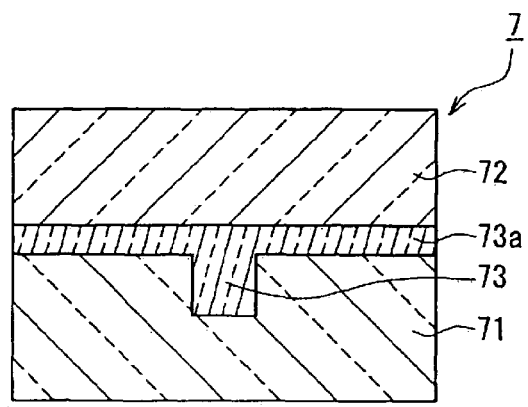
FIG. 7 is a cross-sectional view showing the configuration of an optical waveguide of Embodiment 3.

An optical waveguide of Embodiment 3 of the present invention will be described with reference to the drawings. FIG. 7 is a cross-sectional view showing the configuration of an optical waveguide 7. As shown in FIG. 7, the optical waveguide 7 includes a core 73, glass substrates (claddings) 71, 72 that surround the core 73, and an adhesive layer 73a. The adhesive layer 73a is combined with the core 73 and formed between the glass substrates 71, 72. A guided optical wave is trapped and propagated in the core 73.

The core 73 is embedded in the glass substrate 71 so as to be exposed on the principal surface of the glass substrate 71 that is opposed to the glass substrate 72. The glass substrates 71, 72 are arranged so as to sandwich the core 73 via the adhesive layer 73a. The glass substrates 71, 72 can be made of the same material. The adhesive layer 73a and the core 73 are formed into a single component.

A product formed, e.g., by heating a polymeric material that includes branched polysilane and polysiloxane is used as the core 73 and the adhesive layer 73a. The cross section of the core 73 is, e.g., 8 $\mu$m square. It is preferable that a relative refractive index difference between the core 73 (the adhesive layer 73a) and the glass substrates (claddings) 71, 72 is 0.25%. The refractive index of the core 73 and the adhesive layer 73a is higher than the refractive indices of the glass substrates 71, 72. The optical waveguide 7 with this configuration can transmit the guided optical waves having wavelengths of 1.3 μm and 1.55 μm in a single mode. The 1.3 m and 1.55 μm guided optical waves often are used in optical communications.

The core 73 is a product formed by a reaction (inorganic reaction) in which the polymeric material including branched polysilane and polysiloxane is heated or irradiated with ultraviolet rays. The polymeric material has such characteristics that its refractive index is reduced by the inorganic reaction. Therefore, the refractive index of the core 73 can be controlled. Moreover, the polymeric material adheres well to a glass material.

By changing a mixing ratio of branched polysilane and polysiloxane, the heating conditions, or the ultraviolet irradiation conditions, the inorganic reaction can be controlled, and thus the refractive index of the core 73 can be controlled as well. This makes it possible to adjust the relative refractive index difference between the core 73 and the glass substrates 71, 72 precisely to a desired value. As described above, the optical waveguide 7 having, e.g., a relative refractive index difference of 0.25% can transmit the 1.3 μm and 1.55 μm guided optical waves in a single mode.

When a product of the inorganic reaction that involves heating of the polymeric material is irradiated partially with ultraviolet rays, the refractive index of the irradiated portion is further reduced. This effect can be used to provide predetermined refractive index distribution in the core 73 of the optical waveguide 7. Thus, the optical waveguide 7 also can have the filter function of transmitting or reflecting a specific wavelength.

Figure 8A:
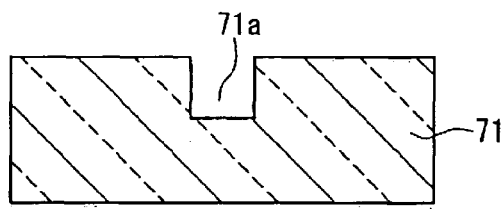
FIGS. 8A to 8C show a flow chart of a method for manufacturing an optical waveguide of Embodiment 3.
Figure 8B:
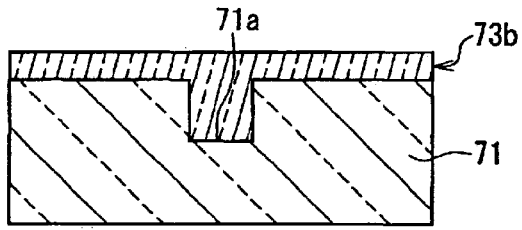
Figure 8C:
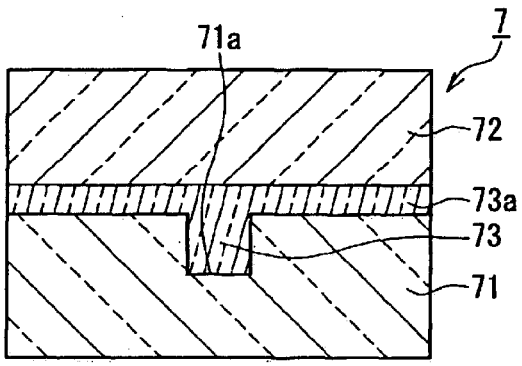

Hereinafter, a method for manufacturing the optical waveguide 7 will be described with reference to the drawings. FIGS. 8A to 8C show the process of the manufacturing method. FIG. 8A shows a process of forming a groove 71a in a glass substrate 71. Since this process is the same as that shown in FIG. 2A, a detailed explanation will not be repeated. FIG. 8B shows a process of forming a resin layer 73b by applying a core material to the surface of the glass substrate 71 that is provide with the groove 71a. The core material is a resin solution including a solvent and the polymeric material that includes branched polysilane and polysiloxane. After the formation of the resin layer 73b, the solvent component is removed by preheating. Since this process is the same as that shown in FIG. 2B, a detailed explanation will not be repeated.

Figure 9:
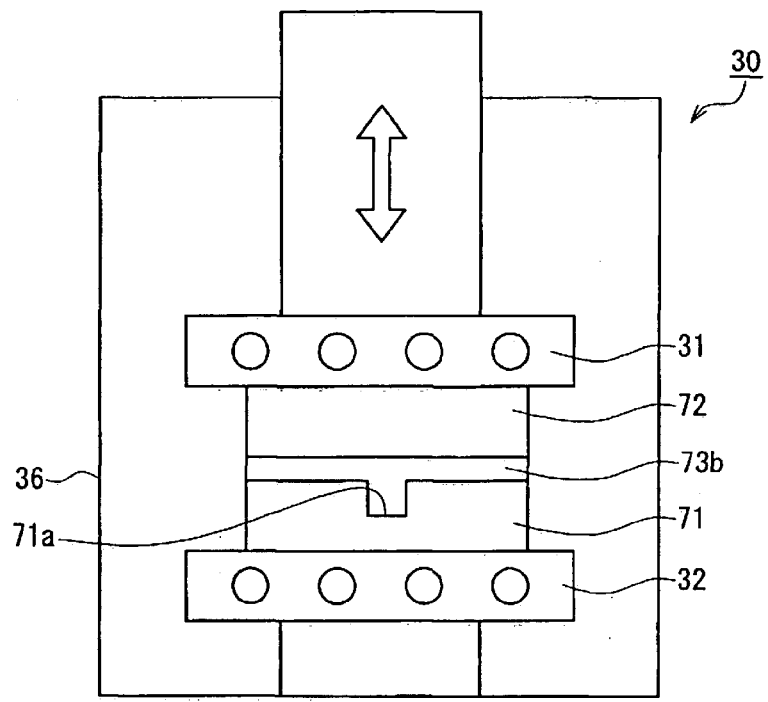
FIG. 9 shows a pressing process in the manufacture of an optical waveguide of Embodiment 3.

Next, a smooth glass substrate 72 is bonded to the resin layer 73b formed on the glass substrate 71. Consequently, as shown in FIG. 8C, a portion of the resin layer 73b is filled in the groove 71a and formed as the core 73, and the remaining portion is formed as the adhesive layer 73a for connecting the glass substrates 71, 72, thus producing an optical waveguide 7. This process is performed by using the press-molding apparatus 30 in FIG. 3. First, the upper die 33 and the lower die 35 are removed from the press-molding apparatus 30. As shown in FIG. 9, the glass substrate 71 with the resin layer 73b is placed on the lower heater block 32, followed by the glass substrate 72. The upper heater block 31 is pressed down on the glass substrate 72. The chamber 36 is filled with air. In this atmosphere, the application of a load to the glass substrates 71, 72 is increased, e.g., to 100 kg/cm$^2$ while the upper and the lower heater block 31, 32 are supplied with electricity and generate heat.

When the polymeric material is heated, the inorganic reaction occurs to change the refractive index. Therefore, a heating temperature at which a desired refractive index can be achieved is determined beforehand based on a calibration curve that shows the relationship between a refractive index and a heating temperature in accordance with actual measurement. For example, a temperature (350° C.) at which the refractive index (ranging from 1.583 to 1.584) of the core 73 meets the single mode condition is determined by the calibration curve, and the glass substrate is heated to this temperature. Consequently, the core 73 of the optical waveguide 7 can have a desired refractive index.

In this manner, the refractive index of the core 73 can be adjusted to a desired value while the glass substrates 71, 72 are bonded together via the adhesive layer 73a as shown in FIG. 8C. Thus, it is possible to reduce the number of steps in the fabrication of the optical waveguide 7.

The surface and cross section of a sample of the optical waveguide 7 thus produced were observed with an optical microscope and an electron microscope. The observation showed that the core 73 was free of bubbles or foreign substances caused by a deficiency of the core material filled in the groove 71a or a joint defect. Moreover, a product of the inorganic reaction of the core material was filled in the groove 71a and formed as the core 73.

Several portions of the sample of the optical waveguide 7 were cut by dicing, and the cross section was observed with an electron microscope. The observation showed that the adhesive layer 73a had a thickness of about 1 μm. This thickness is sufficient to achieve the light trapping effect in the core 73. When the thickness of the adhesive layer 73a is not more than 3 μm, light can be propagated in a single mode. It is desirable that the thickness of the adhesive layer 73a should be not more than 1 μm particularly to reduce a propagation loss.

The single mode optical waveguide 7 was connected to a single mode quartz optical fiber, through which light having a wavelength of 1.55 μm was propagated to measure a propagation loss. The measured propagation loss was about 0.08 dB/cm and not a problem in practical use.

In Embodiment 2, the polymeric material including branched polysilane and polysiloxane is first heated so that the inorganic reaction occurs to change the refractive index. However, the refractive index also can be changed by irradiating the polymeric material with ultraviolet rays in advance of heating. With this ultraviolet irradiation, even when the polymeric material should be heated further until it has a desired refractive index, the heating can be performed at lower temperatures.

Figure 10:
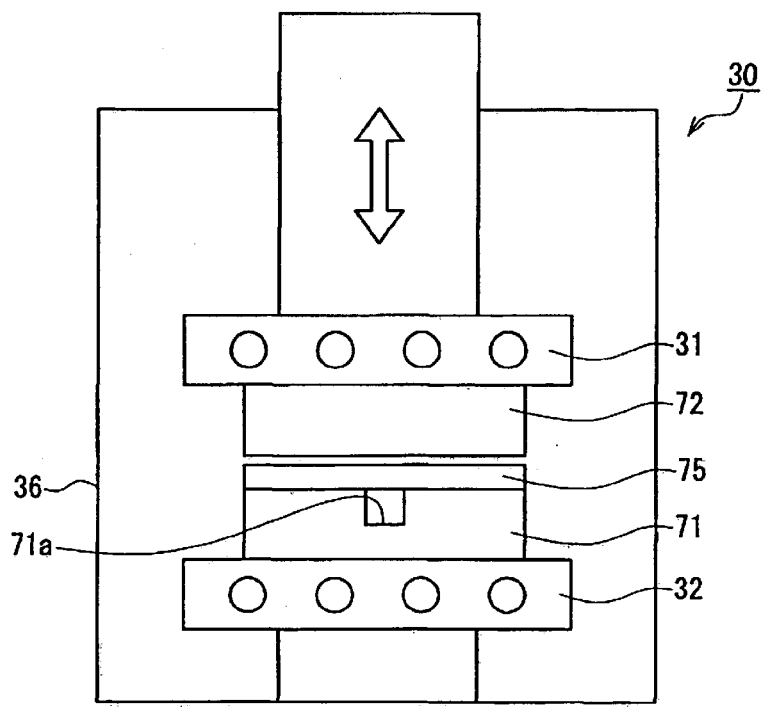
FIG. 10 shows a pressing process in the manufacture of another optical waveguide of Embodiment 3.

In the above manufacturing method of the optical waveguide 7, the resin solution including the polymeric material and a solvent is used as the core material. However, a solid including the polymeric material may be used instead of the resin solution. The manufacturing method employing such a solid core material will be described by referring to FIG. 10. In FIG. 10, a thin film 75 is used as the core material.

As shown in FIG. 10, the glass substrate 71 having the groove 71a is placed on the lower heater block 32 of the press-molding apparatus 30. The film 75 is deposited on the glass substrate 71, followed by the smooth glass substrate 72. Since the film 75 does not include any solvent, preheating is not necessary.

The film 75 is a solid including the polymeric material that includes branched polysilane and polysiloxane. The thickness of the film 75 is, e.g., 10 μm. The mixing ratio of branched polysilane and polysiloxane of the film 75 is the same as that of the resin solution. The upper heater block 31 is pressed down on the glass substrate 72. The chamber 36 is filled with air. In this atmosphere, the application of a load to the glass substrates 71, 72 is increased, e.g., to 150 kg/cm$^2$, while the upper and the lower heater block 31, 32 are supplied with electricity and generate heat.

A heating temperature at which a desired refractive index can be achieved is determined beforehand based on a calibration curve that shows the relationship between a refractive index and a heating temperature in accordance with actual measurement. For example, a temperature (350° C.) at which the refractive index (ranging from 1.583 to 1.584) of the core 73 meets the single mode condition is determined by the calibration curve, and the glass substrate is heated to this temperature. Consequently, the core 73 of the optical waveguide 7 can have a desired refractive index.

In this manner, when the film 75 is heated with the application of a load, a portion of the film 75 enters the groove 71a and is formed as the core 73, and the remaining portion is bonded between the glass substrates 71, 72 and formed as the adhesive layer 73a, as shown in FIG. 8C. The core material is heated so that the refractive index of the core 73 can be adjusted to a desired value. The glass substrates 71, 72 are bonded together via the adhesive layer 73a. These processes can be performed simultaneously, making it possible to reduce the number of steps in the fabrication of the optical waveguide 7.

The surface and cross section of a sample of the optical waveguide 7 thus produced were observed with an optical microscope and an electron microscope. The observation showed that the core 73 was free of bubbles or foreign substances caused by a deficiency of the core material filled in the groove 71a or a joint defect. Moreover, a product of the inorganic reaction of the core material was filled in the groove 71a and formed as the core 73.

Several portions of the sample of the optical waveguide 7 were cut by dicing, and the cross section was observed with an electron microscope. The observation showed that the adhesive layer 73a had a thickness of about 1 $\mu$m. This thickness is sufficient to achieve the light trapping effect in the core 73.

The single mode optical waveguide 7 was connected to a single mode quartz optical fiber, through which light having a wavelength of 1.55 $\mu$m was propagated to measure a propagation loss. The measured propagation loss was about 0.1 dB/cm and not a problem in practical use.

The manufacturing method of an optical waveguide in which a liquid polymeric material 76 that includes branched polysilane and polysiloxane is used as the core material will be described by referring to FIG. 11.

Figure 11:
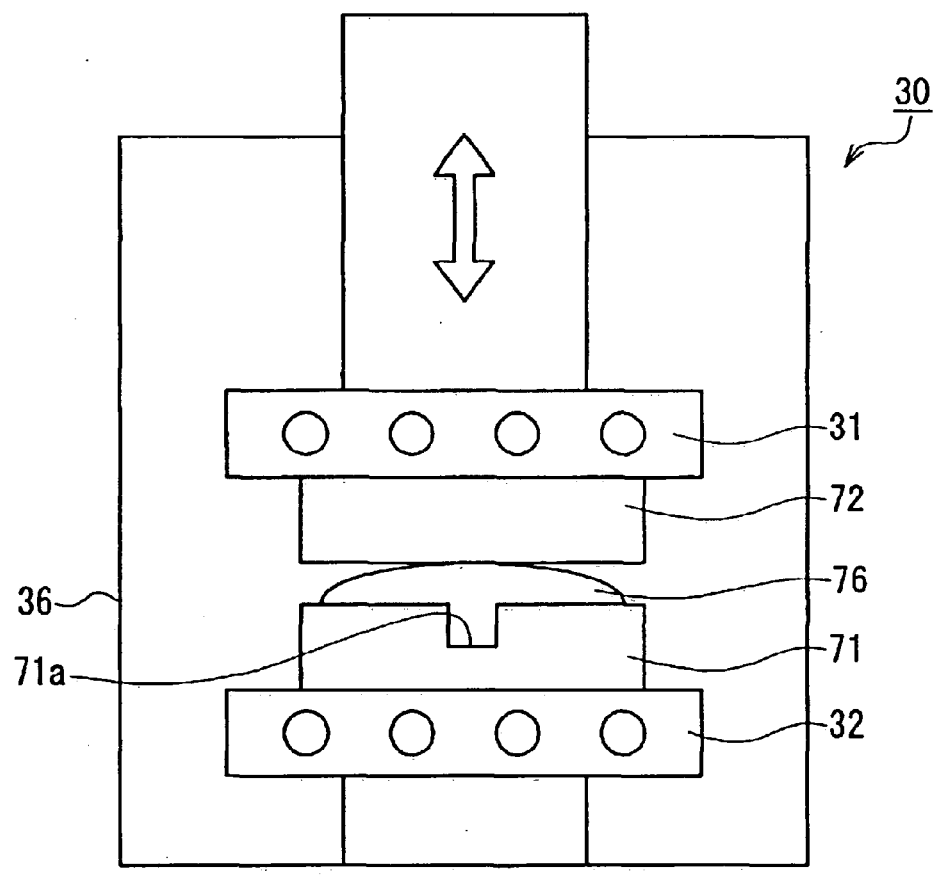
FIG. 11 shows a pressing process in the manufacture of still another optical waveguide of Embodiment 3.
Figure 12A:
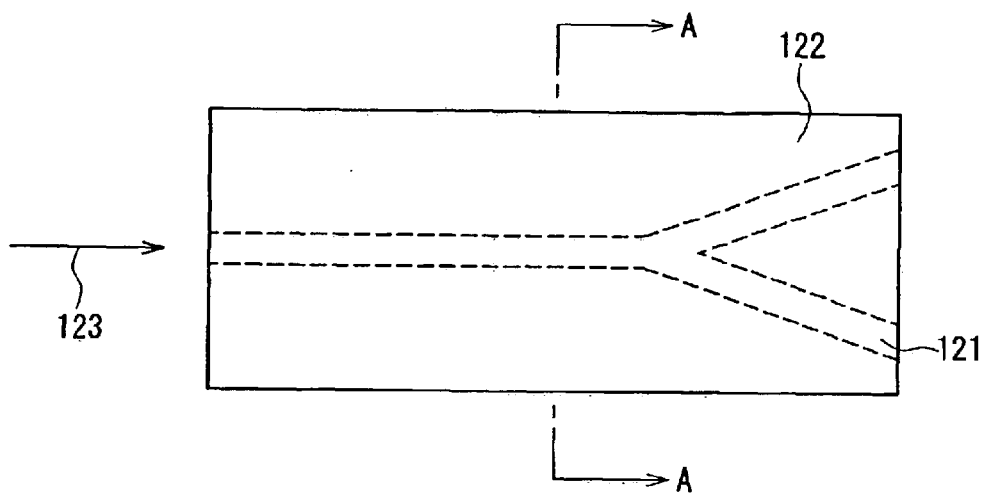
FIGS. 12A and 12B are a plan view and a cross-sectional view that show the configuration of a general single mode silica glass optical waveguide, respectively.
Figure 12B:
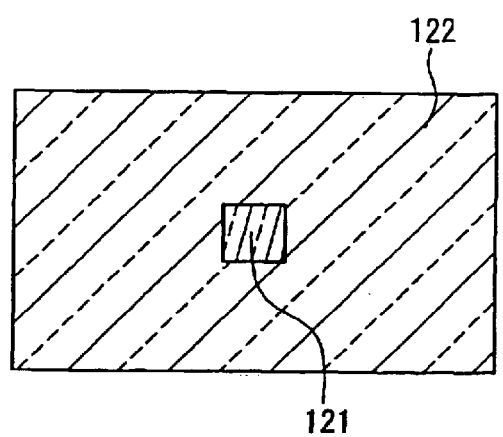
Figure 13A:
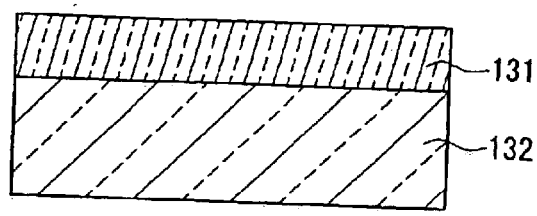
FIGS. 13A to 13C show a flow chart of a general method for manufacturing a conventional silica glass optical waveguide.
Figure 13B:
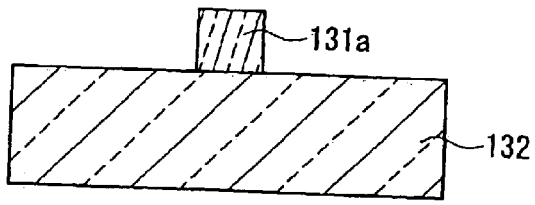
Figure 13C:
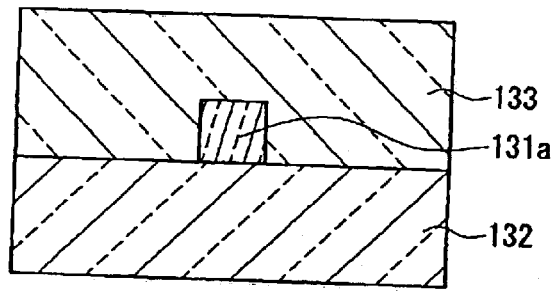
Figure 14A:
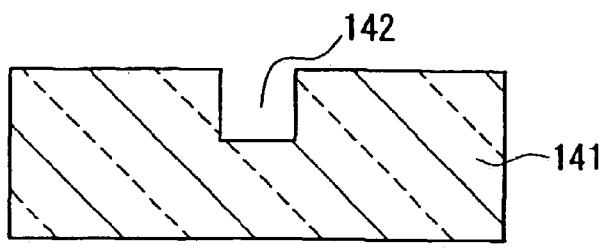
FIGS. 14A to 14D show a flow chart of a method for manufacturing an optical waveguide with a filled groove.
Figure 14B:
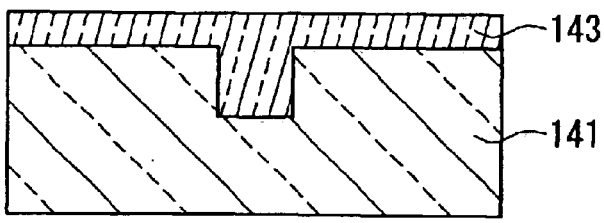
Figure 14C:
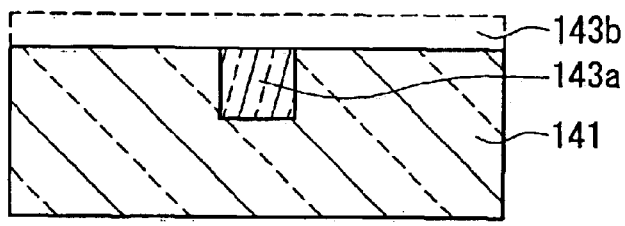
Figure 14D:
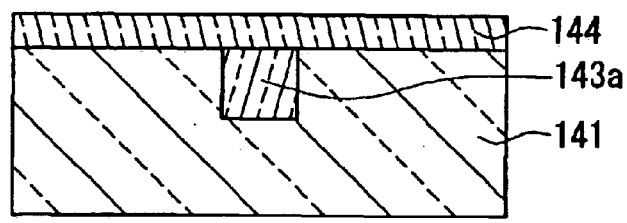

As shown in FIG. 11, the glass substrate 71 having the groove 71a is placed on the lower heater block 32 of the press-molding apparatus 30. The liquid polymeric material 76 is dropped on the glass substrate 71. The mixing ratio of branched polysilane and polysiloxane of the liquid polymeric material 76 is the same as that of the resin solution. Then, the smooth glass substrate 72 is arranged on the liquid polymeric material 76. The glass substrates 71, 72 can be optical glass having a refractive index of 1.595 and a softening point of 540° C. Since the liquid polymeric material 76 does not include any solvent, preheating is not necessary.

Next, the chamber 36 is evacuated with a vacuum pump. The upper heater block 31 is pressed down on the glass substrate 72 so as to apply, e.g., a load of 1 kg/cm² to the glass substrates 71, 72. Subsequently, while air is introduced into the chamber 36 and the load is increased to 50 kg/cm², the glass substrates 71, 72 are heated to 300° C., at which the liquid polymeric material 76 has a desired refractive index. In this manner, the liquid polymeric material 76 enters the groove 71a and is formed as the core 73, as shown in FIG. 8C. The glass substrates 71, 72 are bonded together via the adhesive layer 73a. The refractive index of the core 73 can be adjusted to a desired value. These processes can be performed simultaneously, making it possible to reduce the number of steps in the fabrication of the optical waveguide 7.

The surface and cross section of a sample of the optical waveguide 7 thus produced were observed with an optical microscope and an electron microscope. The observation showed that the core 73 was free of bubbles or foreign substances caused by a deficiency of the core material filled in the groove 71a or a joint defect. Moreover, a product of the inorganic reaction of the core material was filled in the groove 71a and formed as the core 73.

Several portions of the sample of the optical waveguide 7 were cut by dicing, and the cross section was observed with an electron microscope. The observation showed that the adhesive layer 73a had a thickness of about 0.8 $\mu$m. This thickness is sufficient to achieve the light trapping effect in the core 73.

The single mode optical waveguide 7 was connected to a single mode quartz optical fiber, through which light having a wavelength of 1.55 $\mu$m was propagated to measure a propagation loss. The measured propagation loss was about 0.13 dB/cm and not a problem in practical use.

Embodiments 1 to 3 describe a single mode optical waveguide. However, the present invention also can be applied to a multimode optical waveguide. The configuration and materials of an optical waveguide are not limited to those described above. For example, a heat-resistant resin may be used as a cladding instead of the glass substrate. The refractive index can be adjusted to an appropriate value.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical waveguide comprising:
    a first cladding;
    a second cladding; and
    a core,
    wherein the core is embedded in the first cladding so as to be exposed on one principal surface of the first cladding that is opposed to the second cladding,
    the first cladding and the second cladding are arranged so as to sandwich the core,
    the core is a product formed by a reaction in which a polymeric material that comprises branched polysilane and polysiloxane is subjected to at least one process selected from heating and ultraviolet irradiation, and
    a refractive index of the core is higher than refractive indices of the first cladding and the second cladding.

2. The optical waveguide according to claim 1, wherein the refractive index of the second cladding is substantially equal to that of the first cladding.

3. The optical waveguide according to claim 1, wherein the first cladding and the second cladding are glass.

4. The optical waveguide according to claim 1, wherein an adhesive layer is formed between the first cladding including the core and the second cladding.

5. The optical waveguide according to claim 4, wherein the adhesive layer comprises a polymeric material that includes branched polysilane and polysiloxane.

6. The optical waveguide according to claim 4, wherein a refractive index of the adhesive layer is substantially equal to or higher than that of the second cladding.

7. A method for manufacturing an optical waveguide comprising:

heating and softening a first cladding;

forming a groove in the first cladding as a core by pressing a molding die onto the first cladding;

filling the groove with a core material comprising a polymeric material that comprises branched polysilane and polysiloxane;

heating the core material to cause a reaction that changes a refractive index of the core material; and bonding a second cladding to a surface of the first cladding that is provided with the groove.

8. The method according to claim 7, wherein the first cladding and the second cladding are glass.

9. The method according to claim 7, wherein a refractive index of the second cladding is substantially equal to that of the first cladding.

10. The method according to claim 7, wherein the core material is a resin solution comprising the polymeric material and a solvent, the core material of the resin solution is applied to the surface of the first cladding that is provided with the groove, and the groove is filled with the core material, the core material is heated to change the refractive index, and the core material other than that filled in the groove is removed by polishing, and the second cladding is bonded to the surface of the first cladding that is provided with the groove by direct bonding after the polishing.

11. The method according to claim 10, wherein an adhesive is applied to at least one of the surface of the first cladding that is provided with the groove and the surface of the second cladding that is bonded to the first cladding after the removal of the core material by polishing, the adhesive having a refractive index substantially equal to that of the second cladding, and the first cladding and the second cladding are bonded together via the adhesive.

12. The method according to claim 7, wherein the core material is a resin solution comprising the polymeric material and a solvent, the core material of the resin solution is applied to at least one of the surface of the first cladding that is provided with the groove and the surface of the second cladding that is bonded to the first cladding, the core material is pressed between the first cladding and the second cladding, and then is heated to change the refractive index, the groove is filled with the core material, and the first cladding and the second cladding are bonded together via the core material.

13. The method according to claim 7, wherein the core material is a resin solution comprising at least the polymeric material and a solvent, the core material of the resin solution is applied to at least one of the surface of the first cladding that is provided with the groove and the surface of the second cladding that is bonded to the first cladding, and then is heated to evaporate the solvent, and the heating is started at a temperature of not more than a boiling point of the solvent, and the temperature is increased to a temperature less than a temperature at which the reaction that changes the refractive index of the core material is started.

14. The method according to claim 7, wherein the core material is a film comprising at least the polymeric material, the core material of the film is deposited on at least one of the surface of the first cladding that is provided with the groove and the surface of the second cladding that is bonded to the first cladding, the core material is pressed between the first cladding and the second cladding, and then is heated to change the refractive index, the groove is filled with the core material, and the first cladding and the second cladding are bonded together via the core material.

15. The method according to claim 7, wherein the core material is a liquid polymeric material comprising at least branched polysilane and polysiloxane, the core material of the liquid polymeric material is dropped on at least one of the surface of the first cladding that is provided with the groove and the surface of the second cladding that is bonded to the first cladding, the core material is pressed between the first cladding and the second cladding, and then is heated to change the refractive index, the groove is filled with the core material, and the first cladding and the second cladding are bonded together via the core material.

* * * * *